United States Patent
Svärdsjö

[19]

[11] Patent Number: 5,907,481
[45] Date of Patent: May 25, 1999

[54] DOUBLE ENDED ISOLATED D.C.—D.C. CONVERTER

[75] Inventor: Claes Svärdsjö, Norsborg, Sweden

[73] Assignee: Telefonaktiebolaget LM Ericsson, Stockholm, Germany

[21] Appl. No.: 08/962,266

[22] Filed: Oct. 31, 1997

[51] Int. Cl.[6] .................................................. H02M 3/336
[52] U.S. Cl. ......................... 363/25; 363/126; 363/127; 363/89
[58] Field of Search ................... 363/24, 25, 26, 363/126, 127, 89

[56] References Cited

U.S. PATENT DOCUMENTS

| | | | |
|---|---|---|---|
| 4,441,146 | 4/1984 | Vinciarelli | 363/20 |
| 4,519,024 | 5/1985 | Federico et al. | 363/127 |
| 4,646,217 | 2/1987 | Baroni et al. | 363/17 |
| 4,903,189 | 2/1990 | Ngo et al. | 363/127 |
| 5,436,825 | 7/1995 | Wawra et al. | 363/132 |
| 5,729,444 | 3/1998 | Perol | 363/25 |

FOREIGN PATENT DOCUMENTS

| | | |
|---|---|---|
| 0741447A2 | 11/1996 | European Pat. Off. . |
| 4127869 | 4/1992 | Japan . |
| WO9220546 | 11/1992 | WIPO . |

OTHER PUBLICATIONS

"The Performance Of The Current Doubler Rectifier With Synchronous Rectification," Laszlo Balogh, HFPC, May 1995 Proceedings, pp. 216–221.

*Primary Examiner*—Shawn Riley

[57] ABSTRACT

A D.C.—D.C. down converter utilizes a controlled converter primary switching circuit and a full-wave rectified secondary circuit employing synchronous rectification. An isolation transformer having split first and second secondary windings supplies current to the full-wave secondary circuit. The gating signals for synchronous rectification are produced by a switch conduction control including a secondary switch control receiving control signals from the primary switch control through a control current isolating transformer. The secondary switch control is powered by the secondary converter circuit. Through the use of a split secondary winding of the isolation transformer and a full-wave rectifying circuit, the secondary converter circuit of the D.C.—D.C. converter may readily generate drive voltages for supply to the secondary switch control, allowing the secondary converter circuit and load to be fully isolated from the primary converter circuit and input source.

7 Claims, 6 Drawing Sheets

5,907,481

DOUBLE ENDED ISOLATED D.C.— D.C. CONVERTER

FIELD OF THE INVENTION

The present application is generally directed to DC—DC down converters. More particularly, the present invention is directed to improved DC—DC converters employing synchronous rectification.

BACKGROUND AND SUMMARY OF THE INVENTION

DC—DC converters have long been utilized in a variety of electronic devices. Such DC—DC converters often utilize isolation transformers coupled with a controlled converter primary switching circuit for supplying alternating pulses through the isolation transformer and a converter rectification and filtering secondary circuit.

A variety of transformer isolated D.C.—D.C. converters employ diodes to perform signal rectification. In lower voltage applications Schottky diodes are commonly utilized for signal rectification in the converter secondary circuitry. This is because Schottky diodes have a relatively low forward conduction voltage drop of about 0.3 volts. D.C.—D.C. converters employing diode rectification in the secondary circuit are well known and are well described in the literature. However, the forward voltage threshold of approximately 0.3 volts in Schottkey diodes still results in substantial losses in power conversion efficiency, particularly in power supplies having a desired output voltage of about 3.3 volts.

D.C.—D.C. converters are commonly utilized to power integrated circuit electronics. Such integrated circuit electronics typically require a drive voltage of either 3.3 or 5 volts. In order to enhance converter efficiency the voltage drop present in Schottky diodes is desirably avoided in such low voltage DC to DC converters. One proposal for avoidance of the use of Schottky diodes is presented in a publication entitled "The Performance Of The Current Doubler Rectifier With Synchronous Rectification" by Laszlo Balogh, HFPC, May 1995 Proceeding, pg.216. This publication proposes the use of a current doubler rectifier secondary in D.C.—D.C. converters in place of known push-pull, half bridge, and bridge topologies. The publication further proposes to use synchronous rectification to increase converter efficiency in low voltage, current doubler converters by replacing the Schottky diodes with control driven MOS-FETs'. These transistors, according to the publication should be switched on before the conduction of the MOS-FETs body diodes, while avoiding a short circuit across the secondary winding which may be caused by two simultaneously conducting synchronous switches. Thus, the above-mentioned publication proposes to utilize control-driven MOS-FETs in a D.C.—D.C. converter having a current doubler rectifier secondary.

It is clear that the current doubler rectifier employed in the Balogh publication is intended to employ a common input and output ground in order to avoid complex gate drives schemes. Thus, the converter proposed in the Balogh reference cannot provide complete transfer isolation without a complex gate drive scheme. This is primarily due to the reference's avoidance of a center tap in the transformer employed with the current doubler circuitry in order to avoid the complication of a split secondary transformer.

Because of the lack of such a center tap, the voltage output from the transformer secondary in the current doubler circuit proposed by the Balogh reference is too high to feed the gating circuitry used to gate the rectifying MOS FETs. While the secondary transformer voltage may be voltage divided to the desired voltage level, this results in power loss, deteriorating the efficiency of the current doubler rectifier of the Balogh publication. In the circuitry contemplated by the Balogh publication, transistor gating circuit power is likely obtained from the circuit primary since, in the Balogh circuit, a common input and output ground is utilized to avoid such complex gate drive schemes. Thus, the Balogh publication utilizes a driving technique having substantial disadvantages if full isolation between converter primary and secondary circuits is to be achieved.

Half bridge rectifiers such as illustrated in Prior Art FIG. 1 of the present application have also been known. FIGS. 1(a)–(c) of the present application illustrate a Prior Art isolated DC—DC converter which employs a half bridge or push pull primary circuit and a full wave secondary circuit employing Schottky diodes $D_1, D_2$. Converters of this type utilize the first and second rectifying diodes $D_1, D_2$ not only as rectification diodes, but as fly-back diodes as well. This is best understood by an examination of the operation of the FIG. 1 circuitry.

The circuit of FIG. 1 operates in three primary modes illustrated in FIGS. 1(a)–1(c), respectively. A first primary transistor $Q_1$ which, in the preferred embodiment is an MOS-FET is turned on in a manner that is well known. When the first primary transistor $Q_1$ conducts, current flows between the positive and negative (+,−) terminals of the input supply voltage $V_{IN}$ through the conductive first primary transistor $Q_1$, a primary winding $TR_1P$ of isolation transformer $TR_1$, and second ripple filtering capacitor $C_2$. This current is transferred across the core of the transformer $TR_1$ to a first isolation transformer secondary winding $TR_1S_1$ where it is supplied to a load $R_L$ through the first rectifying and fly-back diode $D_1$ and a low-pass filter including filtering or smoothing inductor $L_1$ and secondary filtering capacitor $C_3$. Thus, power is supplied to the load.

When the first primary transistor $Q_1$ is switched off, the first rectifying and fly-back diode $D_1$ continues to conduct due to the free-wheeling action of the filtering or smoothing inductor $L_1$. At this time, when both of the first and second primary transistors $Q_1, Q_2$ are turned off, the second rectifying and fly-back diode $D_2$ also begins to conduct as illustrated in FIG. 1(b). At this time, both diodes $D_1$ and $D_2$ are operating as fly-back diodes, supplying the residual energy stored in the filtering or smoothing inductor $L_1$ to the load. Thus, the diodes $D_1, D_2$ operate in conjunction with the filtering or smoothing inductor $L_1$ to form a free-wheeling or fly-back path through which the current within the inductor $L_1$ can "free-wheel".

Subsequently, the second primary transistor $Q_2$ is switched on, conducting current from the input supply voltage $V_{in}$ through capacitor $C_1$, the isolation transformer primary $TR_1P$, and the second primary transistor $Q_2$. This induces current along a loop including the second isolation transformer secondary $TR_1S_2$, through the center tap CT of the secondary, the load $R_L$, the filtering or smoothing inductor $L_1$, and the second rectifying and fly-back diode $D_2$. Once again, the filtering or smoothing inductor $L_1$ and secondary filtering capacitor $C_3$ function to low-pass filter this output voltage, smoothing it into a more nearly constant voltage $V_0$. When transistor $Q_2$ again becomes non-conductive, diodes $D_1$ and $D_2$ operate as fly-back diodes transferring the current from the filtering or smoothing inductor $L_1$ to the load $R_L$.

The converter of FIG. 1 exhibits the known efficiency problems of converters utilizing Schottky diodes for signal rectification in the secondary side of the converter, as mentioned above.

Applicants of the present application have discovered that DC—DC converters employing full wave secondary rectifying circuits are substantially advantageous over current doubler secondary circuits of the type disclosed in the Balogh publication when both high efficiency and full isolation is desirable. This is because such full-wave rectification secondary circuits employing a split secondary winding transformer exhibit intermediate voltages at the transformer secondary both accessible and of a level desirable for gate circuit drive, which voltages are not present in the current doubler circuitry of the aforementioned Balogh publication.

While the use of a current doubler secondary circuit of the type proposed by the Balogh publication produces efficient D.C. to D.C. conversion, the Balogh secondary may not be easily and efficiently gated by circuitry powered by the converter secondary circuit which is fully isolated from the converter primary circuit. However, Balogh considers the use of a full wave secondary to be distinctly inferior to use of a current doubler rectifier.

In a DC to DC converter having a full wave secondary and split transformer secondary windings designed to drive the electronic circuitry at a normal drive voltage of, for example, 3.3 or 5 volts, the output of either secondary winding of the transformer is of the voltage level desirable for supplying power to electronic circuitry. However, at low voltages, the forward voltage drop of the rectification diodes is undesirable. It is therefore desirable to employ synchronous gating in a D.C.—D.C. converter having a full wave secondary, as such a D.C.—D.C. converter can more easily obtain the desired drive circuitry supply voltages from the converter secondary circuit. For this reason, such a converter is preferable, particularly in applications which require complete isolation between the converter primary circuit and the secondary circuit and load. Thus, although the isolated full wave DC to DC converter of the present invention requires a transformer with a split secondary, a gating circuitry drive voltage of a desired level may be readily obtained across either of the secondary coils without substantial efficiency loss, while maintaining full primary/ secondary isolation.

SUMMARY OF THE INVENTION

Thus, applicant has designed a DC—DC converter using a transformer with a split secondary coupled to a full-wave rectifying secondary circuit. In this secondary circuit, synchronous switches are used and are driven by a switch conduction control controlling the conduction of the primary power supply switches and further controlling conduction of the first and second rectifying switches.

According to the further teachings of the present application, the switch conduction control includes a primary switch control controlling conduction of the primary controlled conduction switches, a secondary switch control controlling conduction of the first and second rectifying switches, and a secondary control current isolator isolating said secondary switch control from said primary switch control.

According to the further teachings of the present application, the secondary switch control receives drive current directly from the secondary circuit of the DC to DC converter, thereby providing complete isolation between the primary and secondary circuits of the DC to DC converter.

From the foregoing, it is apparent that it is an object of the present invention to provide a low voltage D.C. to D.C. converter of high efficiency, which may be inexpensively manufactured.

It is another object of the present invention to produce a D.C. to D.C. converter having a fully isolated secondary circuit and load and which utilizes synchronous rectification in the converter secondary circuitry.

It is still another object of the present invention to employ a D.C. to D.C. converter having full isolation and synchronous rectification in the secondary circuitry of the converter, where the drive voltages for gating the synchronous rectifiers in the secondary circuit are obtained from the secondary circuit, thereby maintaining full current isolation of the secondary circuit and the load.

It is still further an object of the present invention to perform the above-mentioned objectives with a circuit that may be inexpensively manufactured.

It is still another object of the present invention to obtain the drive voltages for the aforementioned gating circuitry of the rectifying switches in the full-wave rectification secondary circuitry of the D.C. to D.C. converter by tapping the output voltage of a split secondary coil of a primary isolation.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF PREFERRED EMBODIMENTS

Figure 1A:
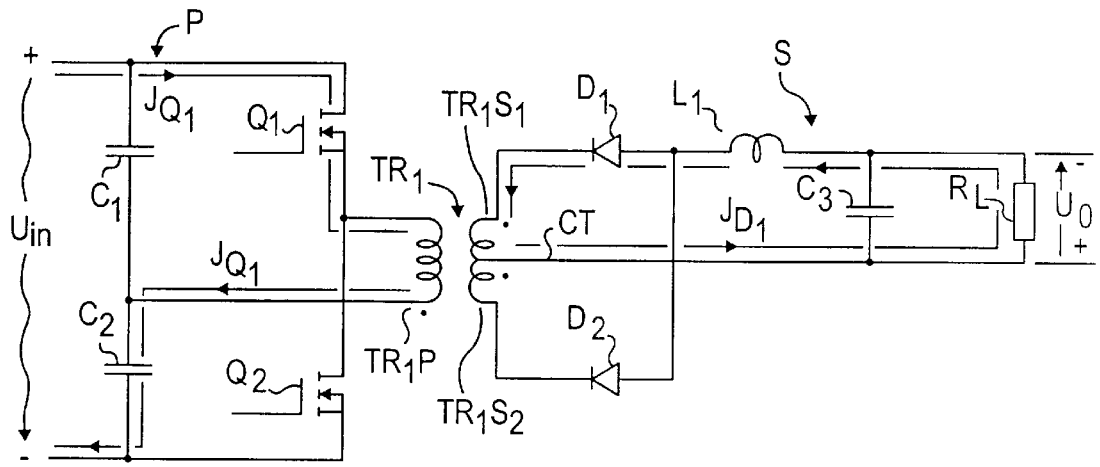
FIGS. 1(a)–1(c) collectively illustrates a Prior Art double ended D.C.—D.C. converter having a push-pull or half bridge primary circuit transformer coupled to a full wave secondary circuit employing diode rectification as well as the operation of this circuit.
Figure 1B:
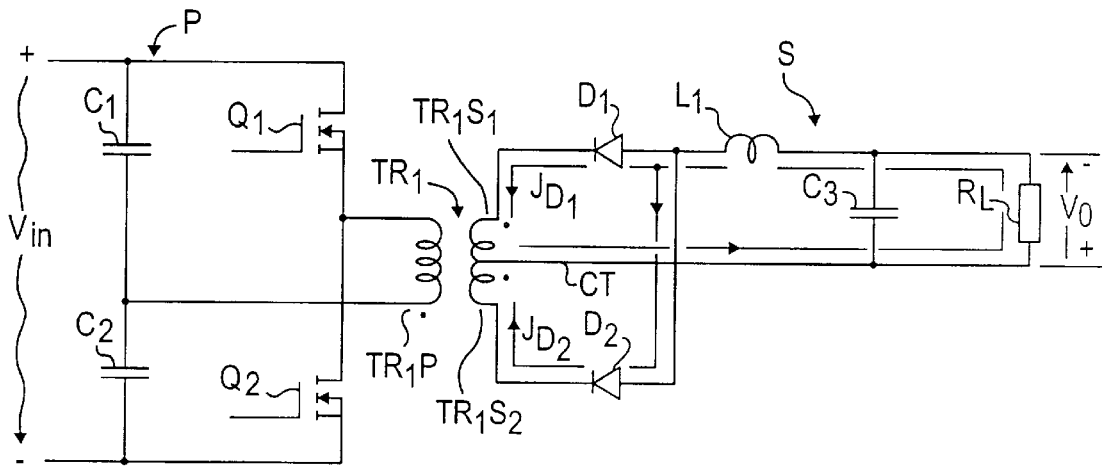
Figure 1C:
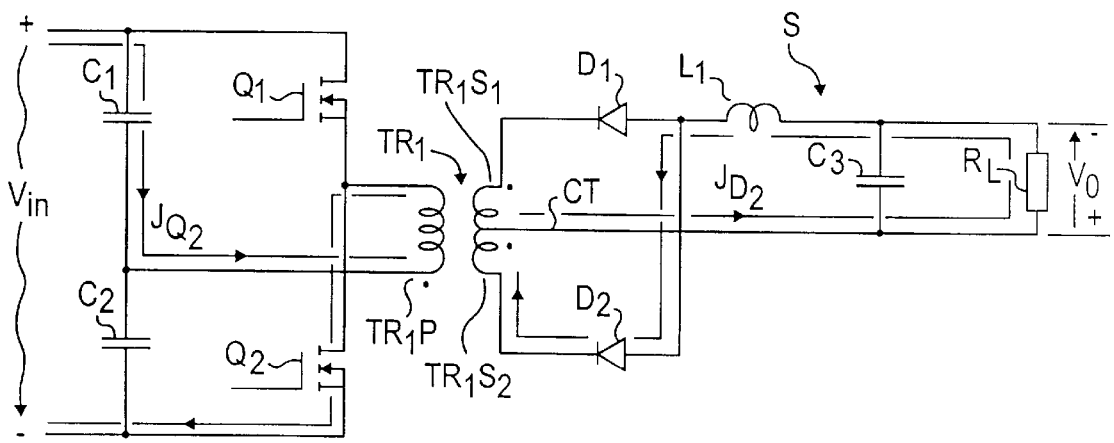
Figure 2:
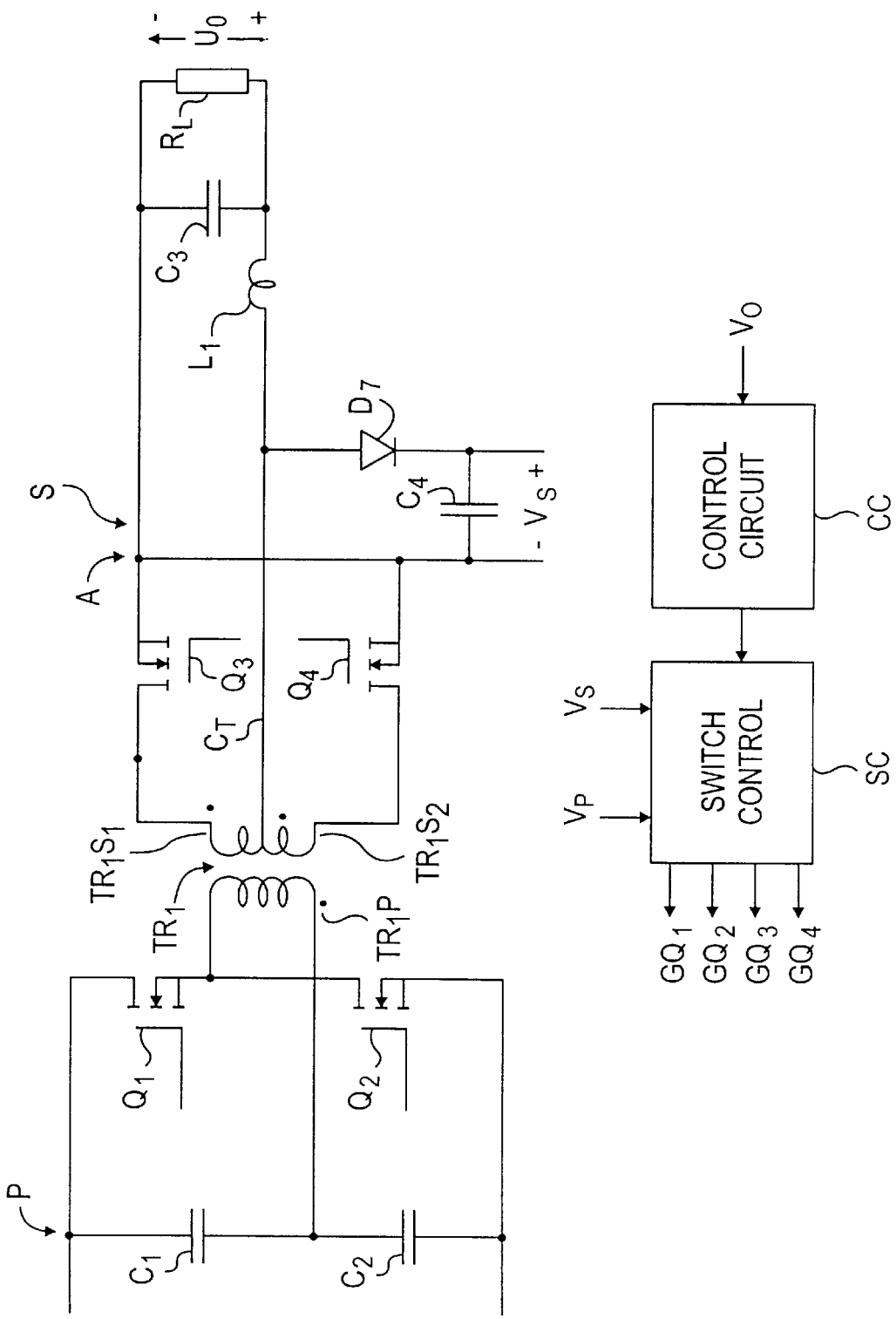
FIG. 2 illustrates a double ended D.C.-D.C converter having a push-pull or half bridge primary circuit and a full wave fully isolated secondary circuit utilizing active control transistor switch rectification.

FIG. 2 illustrates a double ended D.C.-D.C converter having a push-pull or half bridge primary circuit and a full wave secondary circuit utilizing active control transistor switch rectification. The circuit of FIG. 2 is similar to the circuit of Prior Art FIG. 1 but replaces the first and second rectifying diodes $D_1.D_2$ of FIG. 1 with controlled first and second rectifying transistors $Q_3,Q_4$.

The circuit illustrated in FIG. 2 converts an input voltage $V_{in}$, into an output voltage $V_o$, so long as the output voltage $V_o$ is less than the input voltage $V_{in}$. The input voltage $V_{in}$ has a positive (+) terminal connected to a first terminal or drain of a first transistor $Q_1$. The second terminal or source of the first transistor $Q_1$ is connected to a first terminal or source of a second primary transistor $Q_2$. The second terminal or source of the second primary transistor $Q_2$ is connected to the negative (−) terminal of the input supply voltage $V_{in}$.

An isolation transformer $Tr_1$ is provided between the primary circuit portion (generally indicated as P) and including first and second primary transistors $Q_1, Q_2$, and the secondary circuit portion (generally indicated as S) of the double ended converter of FIG. 2. Consequently, an isolation transformer primary winding $Tr_1P$ is connected to the primary circuit portion P of the half bridge converter of FIG. 2. A first terminal of the isolation transformer primary winding $TR_1P$ is connected between the second terminal of the first primary transistor $Q_1$ and the first terminal of the second primary transistor $Q_2$. The second terminal of the isolation transformer primary winding $TR_1P$ is commonly connected to first and second ripple filtering capacitors $C_1$, $C_2$ which are, in turn, connected to the positive and negative terminals (-,+) of the input voltage $V_{in}$.

The secondary circuit portion S of the double ended converter of FIG. 2 utilizes, in the preferred embodiment, a split isolation transformer secondary including a first isolation transformer secondary winding $Tr_1S_1$ and second isolation transformer secondary winding $Tr_1S_2$. The center tap CT between the first and second isolation transformer secondary winding $Tr_1S_1, Tr_1S_2$ is connected to a first terminal of a smoothing or filtering inductor $L_1$.

The remaining terminal of the first isolation transformer secondary winding $Tr_1S_1$ is connected to a first terminal of a first rectifying transistor $Q_3$. Similarly, the remaining terminal of the second isolation transformer secondary winding $Tr_1S_2$ is connected to a first terminal of a second rectifying transistor $Q_4$. The second terminals of the first and second rectifying transistors $Q_3$, $Q_4$ are commonly connected to provide a secondary referenced ground A. A second terminal of the filtering or smoothing inductor $L_1$ is connected to a first terminal of a load $R_L$ supplied an output voltage $V_0$ at the output of the secondary circuit portion S. A second terminal of the load $R_1$ is connected to the secondary referenced ground A. A secondary filtering capacitor $C_3$ is connected in parallel to the load $R_L$. Filtering or smoothing inductor $L_1$ and secondary filtering capacitor $C_3$ collectively form a low pass filter.

The first and second rectifying transistors $Q_3, Q_4$ are switched by a switch control SC under control of a control circuit CC. In one preferred embodiment, the control circuit CC outputs first and second switch gate signals GQ1,GQ2, the switch control SC timing the gating of the first and second rectifying switch gate signals GQ3,GQ4 therefrom. These signals are supplied to the first and second primary transistors Q1,Q2 and the first and second rectifying transistors Q3,Q4.

In the embodiment shown in FIG. 2, the control circuit CC may provide a signal representative of desired duty cycle to the switch control SC. Of course, the control circuit CC can also supply primary gating signals A,B to the switch control SC as explained below with reference to FIG. 4 of the present application. However, one of the control circuit CC or switch control SC, depending on which develops the first and second switch gate signals GQ1,GQ2 varies the duty cycle (on time) of the primary gate pulses GQ1, GQ2, as known in the art, and consequently the conduction periods of the secondary gate signals GQ3, GQ4 as well.

As will be explained in greater detail with respect to FIG. 4, the control circuit CC and the switch control SC are biased by a primary control supply voltage $V_p$. The control supply voltage $V_p$ in accordance with the teachings of the present application may be derived from any suitable source such as the primary circuit portion P of the D.C.—D.C. converter of the present application. However, if full isolation of the secondary circuit portion S from the primary circuit portion P is desired, the gating circuitry for gating the first and second rectifying transistors Q3,Q4 must be fully isolated from the primary circuit portion P. This is accomplished by supplying the secondary switch gating portions (SG of FIG. 4) of the switch control SC, which gate the first and second rectifying transistors Q3,Q4, with a secondary control supply voltage $V_s$. The use of this secondary supply voltage $V_s$ to supply the secondary switch gating portions SG maintains full isolation of the secondary circuit portion S. However, the secondary control supply voltage $V_s$ must then be derived from the secondary circuit portion S.

In the embodiment of FIG. 2, the secondary control supply voltage $V_s$ is obtained at a point A located between the commonly connected second terminals of the first and second rectifying transistors $Q_3, Q_4$ and the first terminal of the filtering or smoothing inductor $L_1$. The anode of a bias current collection diode $D_7$ is connected to this point A and supplies current to a first terminal of the bias voltage capacitor $C_4$. The second terminal of a bias voltage capacitor $C_4$ is connected to the center tap CT provided between the first and second isolation transformer secondary windings $Tr_1S_1, Tr_1S_2$. Thus the secondary control supply voltage $V_s$ is derived across one or both of the first and second transformer secondary windings $Tr_1S_1, Tr_1S_2$.

Figure 3:
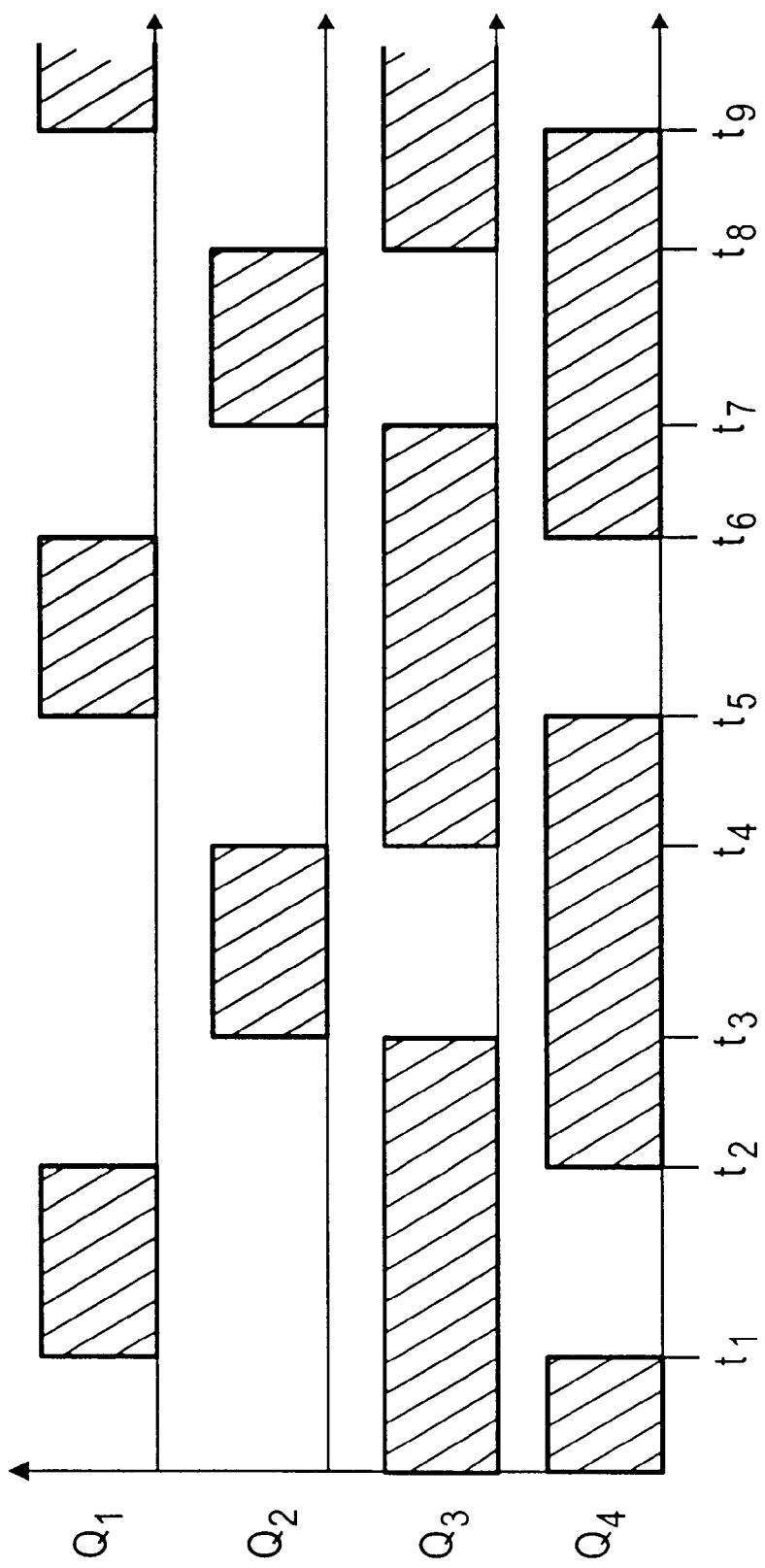
FIG. 3 is a timing chart illustrating as exemplary switching of transistors $Q_1$–$Q_4$ in the embodiment of FIG. 2.

FIG. 3 illustrates the gate signals produced by the switch control SC of FIG. 2. Such gate signals could easily be developed by suitable logic as would occur to one of ordinary skill in the art, with knowledge of the attached timing chart of FIG. 3. Under control of the switch control SC, and beginning immediately before time $T_1$ of FIG. 3, the switches are actuated by the switch control SC as follows:

Immediately before time $T_1$, the gating signals GQ3,GQ4 applied to transistors $Q_3$ and $Q_4$ are present, and these transistors are conductive. At time $T_1$, the gate signal GQ4 applied to transistor $Q_4$ is turned off to render this transistor $Q_4$ non-conductive. Substantially simultaneously, the gate signal GQ1 supplied to transistor $Q_1$ is turned on to render this transistor conductive. At time $T_2$, the gating signal GQ1 to transistor $Q_1$ is turned off and substantially simultaneously, the gating signal GQ4 applied to transistor $Q_4$ is turned on.

At time $T_3$, the gating signal GQ3 applied to transistor $Q_3$ is turned off while the gating signal GQ2 applied to transistor $Q_2$ is turned on. At time $T_4$, the gating signal GQ2 applied to transistor $Q_2$ is turned off and the gating signal GQ3 applied to transistor $Q_3$ is turned on. At time $T_5$, the gating signal GQ4 applied to transistor $Q_4$ is turned off and the gating signal GQ1 applied to transistor $T_1$ is turned on. Thus, at time $T_5$, the same changes to the gating signals are created as performed at time $T_1$. Accordingly, the transitions occurring at times $T_1-T_4$ are repeated for times $T_5-T_8$, times $T_9-T_{12}$, and subsequent equivalent time periods. In this manner, transistor $Q_1$ and transistor $Q_2$ are never simultaneously gated; transistor $Q_1$ and transistor $Q_4$ are not simultaneously gated; and transistor $Q_2$ and transistor $Q_3$ are not simultaneously gated. However, one of transistors $Q_1$ and $Q_4$ are conductive at substantially all times. Similarly, one of transistors $Q_2$ and $Q_3$ are conductive at substantially all times.

Figure 4:
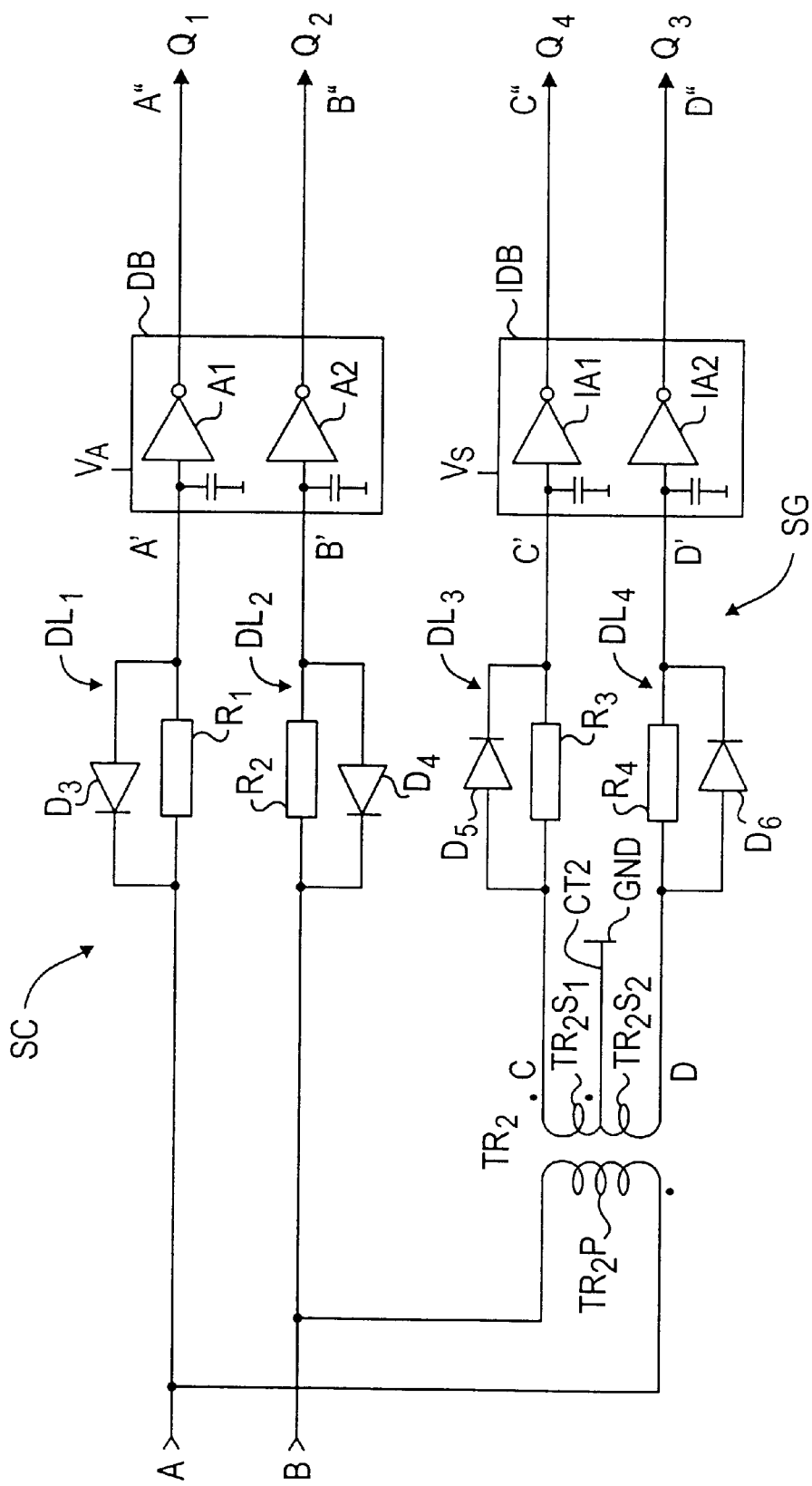
FIG. 4 illustrates one embodiment of a switching circuit SC used to switch the transistors $Q_1$–$Q_4$ of FIG. 3.

FIG. 4 illustrates one embodiment of the switch control SC of the present invention. In FIG. 4, signals A and B are pulse signals generated by control circuit CC of FIG. 2. The control circuit CC of FIG. 2 monitors the load or output voltage $V_o$ across the load impedance $R_L$ and controls this output voltage to a desired voltage level by varying the pulse width of pulse signals A,B, which in one preferred embodiment generally correspond to the transistor gate signals $GQ_1$, $GQ_2$ of FIG. 3.

In the FIG. 4 embodiment, however, the pulse signals A and B obtained from the control circuit CC of FIG. 2 are further processed by the switch control SC which is illustrated in further detail in FIG. 4. The pulse signals A,B of the control circuit CC of FIG. 2 are processed by the FIG. 4 switch control to produce first and second primary transistor gating signals A", B". In the circuit of FIG. 4, each of the input pulse signals A, B from the control circuit CC is supplied to a first delay circuit $Dl_1$ including a resistor $R_1$ and diode $D_3$ in the case of the input signal A, and a second delay circuit $Dl_2$ formed of a resistor $R_2$ and diode $D_4$ is connected to the input signal B from the control circuit CC. The outputs of these first and second delay circuits $Dl_1, Dl_2$ are illustrated as delayed signals A' and B' of FIG. 5. These delayed signals A',B' are supplied to a primary side drive buffer DB including first and second non-inverting buffer amplifiers $A_1, A_2$ to produce output signals A",B" which have the input thereof delayed a predetermined delay $td_1, td_3$, respectively. Thus, the leading edges of the first and second primary transistor gating signals A",B" (also known as $GQ_1, GQ_2$) are delayed a time delay from the gating signals provided by the control circuit CC. The inputs A,B to the switch control SC are also provided to a primary coil $Tr_2P$ of a small signal transformer $Tr_2$.

The small signal transformer $Tr_2$ is provided with a primary coil $Tr_2p$ and split secondary coils $Tr_2S_1, Tr_2S_2$ including small signal transformer center tap $CT_2$ which is connected to the local ground of the secondary circuit, $GND_2$. The first and second small signal transformer secondary coils $T_{r2}S_1$ and $T_{r2}S_2$ output the pulse signals C,D which correspond to pulse signals A,B but which are fully isolated from the primary circuit portion P and the input voltage $V_{IN}$. The pulse signal C is passed through a third delay circuit $Dl_3$ including a third delay circuit resistor $R_3$ and third delay circuit diode $D_5$ to produce an output signal C' having its trailing edge delayed.

The first and second delay circuits $DL_1$ and $DL_2$ have the cathode of their respective diodes $D_3, D_4$ connected to the input signals A,B so that the leading edge of the pulses A,B will be delayed. In contrast, the third delay circuit $DL_3$ utilizes the diode $D_5$ with its anode connected to the first small signal transformer secondary of the small signal transformer $TR_2$ so that the trailing edge of the pulse signal C will be delayed to form delay signal C', which is supplied to an inverting drive buffer IDB. Similarly, the second small signal transformer secondary coil $TR_2S_2$ produces a pulse signal D which is isolated from but otherwise identical to pulse signal B. Because of the operation of a forth circuit delay $DL_4$ with its delay resistor $R_4$ and delay diode $D_6$, the trailing edge of pulse signal D is delayed to produce delayed signal D' which is supplied to the inverting drive buffer IDB.

The inverting drive buffer IDB includes respective inverting buffer amplifiers $IA_1$, $IA_2$ which sharpen the delay edge and invert the delayed signals C' ,D' received thereby. Thus, signal C" and D", used to drive the first and second rectifying transistors $Q_3, Q_4$, have their leading edge delayed a predetermined time delay $td_2, td_4$, a delay standard from the trailing edge of control signals A, B. Since output signals A" and B" used to drive the first and second primary transistors $Q_1$ and $Q_2$ also have their leading edges delayed a time delay $td_1, td_3$, respectively, the output signal A" utilized to drive the first primary transistor $Q_1$ and the output signal C" utilized to drive the second rectifying transistor $Q_4$ have conductive periods separated by the delay time $td_1$ or $td_3$, to prevent cross-conduction when $Q_1$ turns on and $Q_4$ turns off, and when $Q_4$ turns on and $Q_1$ turns off. Similarly, a delay is present between the output B" used to control the second primary transistor $Q_2$, and the first rectifying transistor $Q_3$, separating the conduction periods of these respective transistors by dead times $td_2$ and $td_4$.

The primary transistor gating signal generation circuitry including the first and second delays $DL_1$, $DL_2$ and the drive buffer DB are, in the embodiment of FIG. 4 preferably driven by a voltage $V_P$ derived from the primary circuit portion P of FIG. 2. In order to fully isolate the secondary circuit portion, the third and fourth delays $DL_3$ and $DL_4$ as well as the inverted drive buffer IDB are driven by a voltage $V_S$ derived from the secondary circuit portion S of the circuit of FIG. 2 as already explained. Since the gating signals are derived from signals C,D supplied through the small signal transformer $TR_2$, full isolation is thereby obtained.

Figure 6:
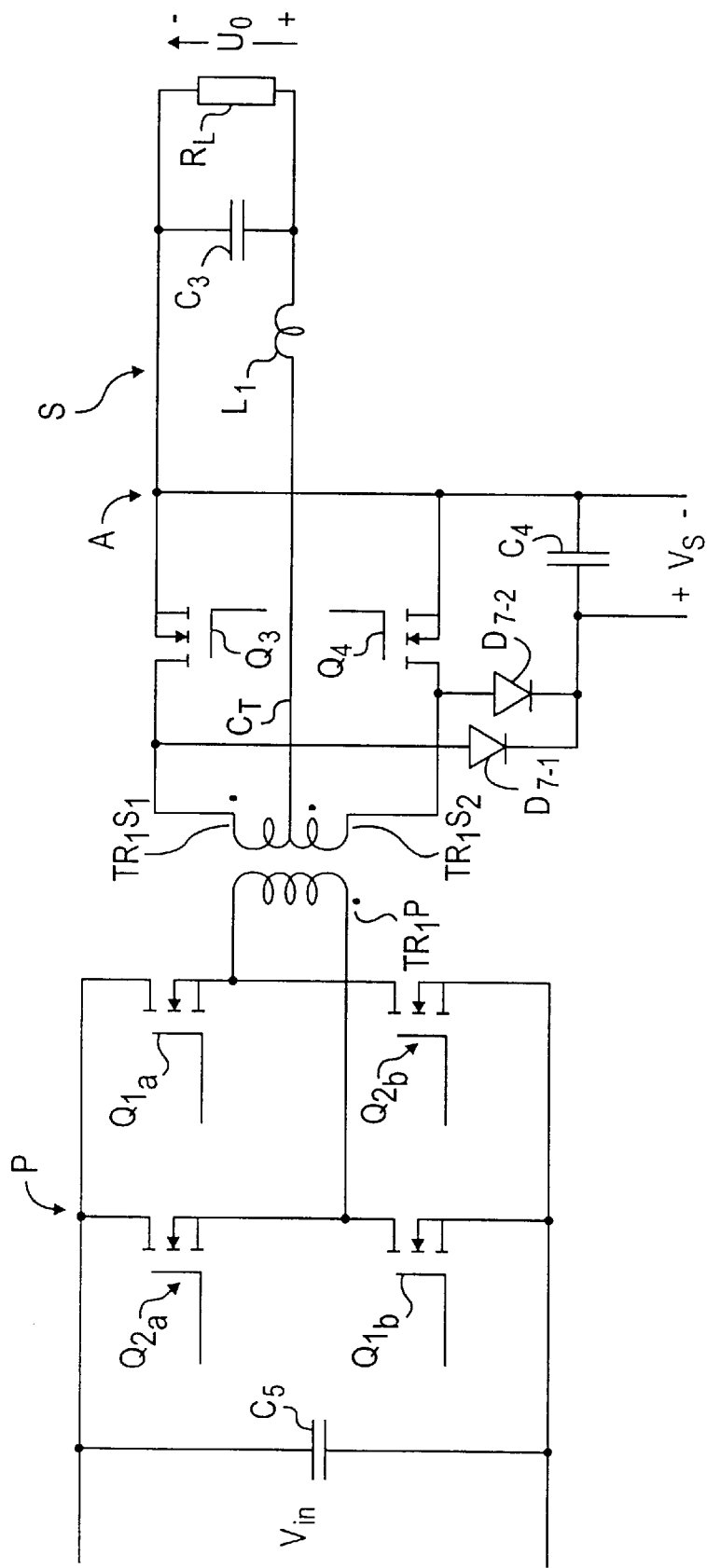
FIG. 6 illustrates a double ended full bridge converter embodiment having a full bridge primary circuit and applying the principles of the present application.

FIG. 6 illustrates an alternative embodiment of the present invention where a full wave bridge primary circuit portion P is utilized in a double ended converter employing the techniques of the present application.

The circuitry of FIG. 6 differs from that of FIG. 2 in two primary respects. Firstly, the primary circuit portion P of the circuit of FIG. 6 employs a full-wave bridge primary circuit. In such a full-wave bridge primary circuit, the voltage $V_{IN}$ is connected across a primary circuit filtering capacitor $C_5$. The voltage $V_{IN}$ is further applied across a pair of serially connected switches $Q_{2A}, Q_{1B}$ and further connected across a pair of serially connected switches $Q_{1A}, Q_{2B}$. The primary coil $TR_{1P}$ of the primary isolation transformer $TR_1$ is connected, at one terminal thereof, to the interconnection between transistor $Q_{1A}$ and $Q_{2B}$, and at another terminal thereof, to the point at which transistor $Q_{2A}$ and transistor $Q_{1B}$ are connected. In the circuit of FIG. 6, the signal $GQ_1$ of FIG. 3 or the signal A" of FIG. 5 may be connected to $Q_{1A}$ and $Q_{1B}$ while the signal $G_{Q2}$ or the signal B" of FIGS. 3 and 5 respectfully may be connected to transistors $Q_{2A}, Q_{2B}$. In this fashion, current through the isolation transformer $TR_1$ may be alternatingly generated through the conduction of the $Q_{1A}$, $Q_{1B}$ transistor pair, and the subsequent conduction of the $Q_{2A}, Q_{2B}$ transistor pair.

FIG. 6 also illustrates an alternative methodology for generating the secondary control supply voltage $V_S$, which in this embodiment is obtained between the center tap CT and either the first secondary coil of the isolation transformer $TR_1S_1$ or the second secondary coil $TR_1S_2$ of the isolation transformer $TR_1$ through either of the bias current collection diodes D7-1, D7-2 to derive the secondary control voltage $V_S$ across the bias voltage capacitor $C_4$. FIG. 6 illustrates the secondary control supply voltage $V_S$ being obtained from the output of both of the secondary coils $TR_1S_1, TR_1S_2$ as this ensures that the secondary circuit of the DC—DC converter of the present application remains balanced. However, it is possible to derive the secondary control supply voltage $V_s$ from either of the secondary coils $TR_1S_1$, $TR_1S_2$ of the isolation transformer $TR_1$.

DESCRIPTION OF OPERATION

In relatively low voltage DC—DC down converters, it is highly preferable to utilize synchronously gated switches $Q_3, Q_4$ of FIG. 2 in place of rectifying and fly-back diodes. Such transistors $Q_3, Q_4$ may be constructed in any suitable fashion. In the preferred embodiment, MOS-FETs are utilized. Such transistors exhibit a forward voltage drop of about 0.1 volt when conductive and thus, when gated in accordance with the signals of FIG. 3 or FIG. 5 of the present application, provide a DC—DC converter having improved power transfer efficiency.

While the use of such synchronously switched rectification is known in circuits with a voltage doubler secondary, such a voltage doubler secondary could not easily provide full current isolation between the primary circuit portion P and the secondary circuit portion S. However, the use of full-wave rectification in the secondary circuit portion S as illustrated in FIG. 2, in conjunction with the use of the split isolation transformer secondary including first isolation transformer secondary coil $TR_1S_1$ and second isolation transformer secondary coil $TR_1S_2$ provides a voltage in the secondary circuit portion of a level needed to drive the secondary gating portions SG of the switch control SC. Thus, obtaining a secondary control supply voltage $V_S$ to drive the secondary gating portions SG is more easily accomplished in such a full-wave conversion secondary where a split secondary coil of the isolation transformer $TR_1$ including transformer secondary coils $TR_1S_1$ and $TR_1S_2$. Consequently, the employment of a full-wave secondary circuit of FIG. 2 is desirable when using control gated switches to rectify the output of the isolation transformer $TR_1$ in the secondary circuit portion S.

FIG. 2 is an example of such a circuit employing a full wave rectified secondary in a D.C.—D.C. down converter with a fully isolated secondary. By replacement of the first and second rectifying and fly-back diodes $D_1,D_2$ of FIG. 1 with the first and second rectifying transistors $Q_3,Q_4$ of FIG. 2, substantially improved power transfer efficiency is exhibited through elimination of the forward voltage drop of approximately 0.3 volts inherent in the Schottky diodes.

The first and second rectifying transistors $Q_3,Q_4$ are controlled by the switch control SC which is also used to control the transistors $Q_1,Q_2$. Basically, transistors $Q_3,Q_4$ are controlled to be on at those times at which the first and second rectifying and fly-back diodes $D_1,D_2$ would be forward biased. Thus, the switch control produces gate signals $GQ_1,GQ_2$ to be supplied to the first and second primary transistors $Q_1,Q_2$ to render them conductive at substantially the same times that diodes $D_1,D_2$ conduct in the FIG. 1 circuit.

The switch control SC of FIG. 2 produces gate signals for the first and second rectifying transistors $Q_3,Q_4$ which gate signals $GQ_3,GQ_4$ are also illustrated in the timing diagram of FIG. 3. Thus, transistor $Q_3$ is turned on by the gate signal $GQ_3$ at times in which the transistor $Q_1$ is gated by the gate signal $GQ_1$. Similarly, the transistor $Q_4$ is gated on by gate signal $GQ_4$ at the same time that transistor $GQ_2$ is gated by gate signal $GQ_2$. At times when neither transistor $Q_1$ or $Q_2$ is conductive, both transistors $Q_3$ and $Q_4$ are conductive to produce a fly-back phenomenon, transferring the energy from the filtering or smoothing inductor $L_1$ to the load $R_L$. Note that it is important that transistor $Q_4$ never conduct while transistor $Q_1$ is conducting and transistor $Q_3$ never conduct when transistor $Q_2$ is conducting. This is because such simultaneous conduction will cause cross-conduction between the primary and secondary via the power transformer thereby causing output current to flow via the body-drain diodes of the secondary switches, causing a significant increase in power loss. Accordingly, it is important to ensure that transistor $Q_3$ is not conductive at the same time as transistor $Q_2$ and that transistor $Q_1$ is not conductive at the same time as transistor $Q_4$.

The circuit of FIG. 2 additionally schematically discloses a control circuit CC which monitors the output supply voltage $V_0$ and changes the duty cycle or conduction period of transistors $Q_1,Q_2$ in order to maintain the output supply voltage $V_0$ at a desired voltage. While this technique is well known in the art, the duty cycle or conduction period of transistors $Q_1,Q_2$ is increased to increase the output supply voltage $V_0$, and decreased to decrease the output supply voltage $V_0$.

Figure 5:
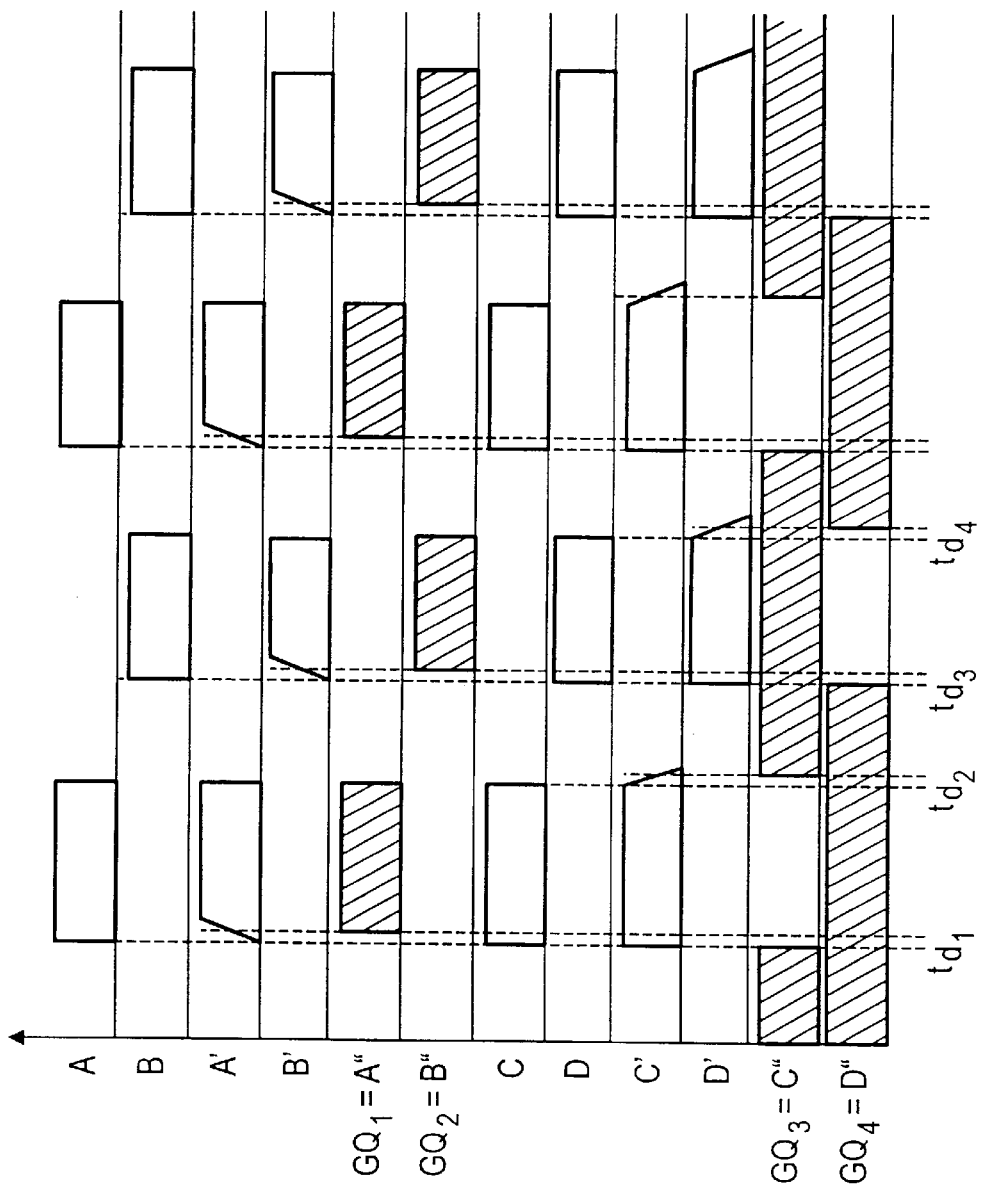
FIG. 5 is a timing chart illustrating the voltages developed in the circuit of FIG. 4 to develop the timing signals used to control transistors $Q_1$–$Q_4$ in the embodiment of FIG. 2.

Desirably, according to the teachings of the present application, small delays should be inserted between the conduction periods of the primary and secondary transistors. FIG. 4 of the present application illustrates an exemplary switch control SC employing such delays, while FIG. 5 illustrates the timing within the switch control SC of FIG. 4. In the switch control embodiment of FIG. 4, the leading edges of the conduction periods of both the first and second primary transistors $Q_1,Q_2$ and the first and second rectifying transistors $Q_3,Q_4$ are delayed a small amount (the dead time $T_{D1}$–$T_{D4}$) to ensure "brake before make" action within the control of the first and second primary transistors $Q_1,Q_2$ and first and second rectifying transistors $Q_3,Q_4$. This "brake before make" action prevents cross-conduction between the primary and secondary across the power transformer. These delays should be either calculated or determined empirically to ensure sufficient "brake before make" action without substantially decreasing converter efficiency due to body-drain conduction in the secondary switches. In other words, the delay between the turn-off of the first and second primary transistors $Q_1,Q_2$ and the turn-on of the first and second rectifying transistors $Q_3,Q_4$ should be sufficiently small to prevent the inherent body-drain diode in the MOS-FETs from conducting.

In the circuit of FIG. 4, pulse width primary gating signals (pulse signals) A,B are supplied by the control circuit CC in a manner which is well known in the art. Such pulse signals A,B are pulse width modulated to produce the desired output supply voltage $V_0$ out of the converter. Delay circuits $DL_1,DL_2$ respectively delay the leading edges of gating signals A,B to produce delayed signals A',B' with ramped leading edges. The drive buffer DB employs a pair of drive buffer amplifiers $A_1,A_2$ which produce a drive signal once a predetermined threshold is exceeded. Since the leading edge of signals A',B' is ramped, the gating signals A",B" ($GQ_1$, $GQ_2$) applied to the first and second primary transistors $Q_1,Q_2$ have leading edges which are time delayed a valued $td_1,td_3$ as illustrated in FIG. 5.

The primary gating signals A,B developed under control of the control circuit CC are also supplied to a small transformer $TR_2$, and in particular, to the primary winding $TR_2P$ thereof. The split secondary windings $TR_2S_1,TR_2S_2$ of the small signal transformer $TR_2$ produce isolated pulse signals C,D which are substantially identical to A,B. Each of these pulse signals C,D is trailing edge delayed by third and fourth delay circuits $DL_3,DL_4$ to produce delayed signals C',D'. The ramp edge of the trailing edge delayed signals C',D', insures that the threshold of the inverted drive buffer IDB and its amplifiers $IA_1,IA_2$ will delay the trailing edge of the respective inverted signals C',D', thereby producing first and second secondary rectifying transistor drive signals C",D" ($GQ_4$ $GQ_3$) which are in turn supplied to the first and second rectifying transistors $Q_3,Q_4$. Thus, the exemplary circuit of FIG. 4 adds dead times $td_1$–$td_4$ to the gating signals, to produce a "brake before make" action preventing undesired cross-conduction between the primary and secondary via the power or isolation transformer $TR_1$.

FIG. 2 of the present application further illustrates a control circuit CC which produces the control signals A,B in response to the monitored output voltage $V_0$. As is apparent to one of ordinary skill in the art, the control signals A,B increase in pulse width as an increase is desired in the output voltage $V_0$. Preferably, the control circuit CC is supplied power $V_P$ from the primary circuit portion P.

The outputs A,B may be generated in accordance with FIG. 3 to provide desired gating signals to the first and second primary transistors $Q_1,Q_2$ and the first and second rectifying transistors $Q_3,Q_4$. Desirably, however, signals $GQ_1$–$GQ_4$ are produced by utilizing the circuit of FIG. 4 in conjunction with the timing diagrams of FIG. 5. In the circuit of FIG. 4, the first and second delays $DL_1,DL_2$ delay the leading edge of the control signals A,B, to delay the beginning thereof. These signals are then amplified by the first and second amplifiers $A_1,A_2$ which are powered by the primary circuit supply voltage $V_P$.

One important objective is to fully isolate the secondary circuit portions of the D.C.—D.C. converter from the primary voltage supply. To accomplish this, the small signal transformer $TR_2$ isolates the control signals A,B, from the secondary switch gating portions SG. The inverting drive buffer IDB which is supplied power by the secondary control supply voltage $V_S$ inverts signals C',D' and sharpens their trailing edge to produce $GQ_3$ and $GQ_4$, the gating signals for the first and second rectifying transistors, which are produced at the output of the inverted drive buffer IDB. All items of the FIG. 4 circuit on the secondary side of the small signal transformer $TR_2$ are fully isolated. Accordingly, this portion of the switch control SC is not powered by the primary side circuit portion P.

Since the circuit of FIG. 2 may easily obtain a secondary control supply voltage $V_S$ without the need of a voltage divider or other voltage step down circuitry, the circuit of FIG. 2 exhibits not only improved efficiency over a diode rectified DC—DC converter, but further the synchronous switches or rectifying transistors $Q_3,Q_4$ may be driven by gating circuitry which is powered by the secondary circuit portion, thereby ensuring full isolation of the converter secondary and it's load.

FIG. 6 of the present application illustrates an alternative embodiment of the present application which utilizes a full-bridge primary structure. Such full-bridge primary structures are well known and the bridge transistors $Q_{1A}$, $Q_{1B}$ or alternatively $Q_{2A},Q_{2B}$ are simultaneously conductive. These transistor pairs may be gated by the signals $GQ_1,GQ_2$ produced at the output of the circuit of FIG. 4 in the manner described above. Thus, the secondary of the circuit of FIG. 6 operates in the same fashion as the circuit of FIG. 2 of the instant application.

Additionally, in the FIG. 6 circuit, the secondary control supply voltage $V_S$ is derived directly from the voltage across one or both of the rectifying transformer $TR_1$ first and second secondary windings $TR_1S_1$, $TR_1S_2$. Consequently, FIG. 6 illustrates first and second secondary control supply voltage diodes $D_{7-1}$, $D_{7-2}$ which produce the desired secondary control supply voltage $V_S$ across a secondary control supply voltage filtering capacitor $C_7$. While FIG. 6 shows this secondary control supply voltage $V_S$ being obtained from both of the two isolation transformer secondary coils $TR_1S_1,TR_1S_2$, it should be clear that either of these two secondary coils may be used to access this secondary control supply voltage $V_S$. However, there are advantages to obtaining this voltage from both transformer secondary coils, as transformer imbalance does not then occur.

It should be understood that the foregoing embodiments are exemplary for the purpose of teaching the inventive aspects of the present application, which inventive aspects are covered solely by the appended claims and encompass all variations not regarded as a departure from the spirit of the scope of the invention. All such modifications as would be obvious of ordinary skill in the art are intended to be included within the scope of the following claims.

I claim:

1. A D.C. to D.C. converter converting an input voltage from an input source to an output voltage for supply to a load, comprising:

an isolation transformer having a primary winding and a split first and second secondary windings;

a primary converter circuit including primary controlled power supply switches for selectively supplying the input voltage to said primary winding of said isolation transformer to produce a substantially symmetrical current in said primary winding;

a full wave secondary fully isolated from said primary circuit and including first and second rectifying switches each connected between a respective one of said first and second secondary windings and the load, said first and second rectifying switches being individually switchable; and a switch conduction control controlling the conduction of said primary power supply switches, said switch conduction control further controlling conduction of said switchable first and second rectifying switches, said switch conduction control including, a primary switch control controlling conduction of said primary controlled power supply switches, a secondary switch control controlling conduction of said first and second rectifying switches, and a secondary control current isolator isolating said secondary switch control from said primary switch control.

2. The D.C. to D.C. converter of claim 1 wherein said secondary control current isolator includes a secondary control isolation transformer providing control signals from said primary switch control to said secondary switch control.

3. The D.C. to D.C. converter of claim 2 wherein said secondary switch control is powered from said full wave secondary to maintain said full wave secondary and said secondary switch control fully isolated from said primary circuit.

4. The D.C. to D.C. converter of claim 2 wherein primary controlled power supply switches include a push and a pull power supply switch;

said primary switch control alternately controlling said push power supply switch to supply the input voltage to said primary winding with a first polarity and controlling said pull power supply switch to supply the input voltage with a second polarity opposite from the first polarity;

said switch control controlling said first rectifying switch to conduct supply current to said load when said push power supply switch is conductive and controlling said second rectifying switch to supply current to said load when said pull power supply switch is conductive;

said switch conduction control maintaining said first rectifying switch nonconductive when said pull power supply switch is conductive and maintaining said second rectifying switch nonconductive when said push power switch is nonconductive.

5. The D.C. to D.C. converter of claim 4 wherein said switch conduction control turns said first rectifying switch on a predetermined delay after said pull power switch is turned off and turns said second rectifying switch on a predetermined delay after said push power switch is turned off.

6. The D.C.—D.C. converter of claim 1 wherein at least one of the primary and secondary switch controls includes delay circuitry for delaying a leading edge of one of the gating pulses applied to the primary power supply switches and the first and second rectifying switches in order to establish desired "break before make" switching.

7. The D.C.—D.C. converter of claims 6 wherein the switch conduction control receives first and second pulse signals for driving the first and second primary power supply switches;

said primary switch control includes a leading edge delay and a drive buffer for each of the first and second primary power switches;

said signal isolation transformer supplying the first and second pulse signals to the secondary switch;

said secondary switch control including a trailing edge delay and inverted drive buffer for each of the first and second pulse signals, the trailing edge delay lengthening each of the first and second pulse signals which are then inverted by the inverted drive buffers to form gating signals for the first and second rectifying switches.

* * * * *